US008619848B2

(12) United States Patent
Jiang (10) Patent No.: US 8,619,848 B2
(45) Date of Patent: Dec. 31, 2013

(54) METHOD, APPARATUS, AND SYSTEM TO COMPENSATE INTER-SYMBOL INTERFERENCE

(75) Inventor: Yueming Jiang, Rancho Cordova, CA (US)

(73) Assignee: Intel Corporation, Santa Clara, CA (US)

( * ) Notice: Subject to any disclaimer, the term of this patent is extended or adjusted under 35 U.S.C. 154(b) by 396 days.

(21) Appl. No.: 12/950,728

(22) Filed: Nov. 19, 2010

(65) Prior Publication Data

US 2012/0128055 A1 May 24, 2012

(51) Int. Cl.
*H03H 7/30* (2006.01)
(52) U.S. Cl.
USPC ........... 375/233; 375/229; 375/220; 375/231; 375/232; 375/343
(58) Field of Classification Search
USPC ......... 375/219, 220, 224, 229, 230, 231, 232, 375/233, 259, 271, 295, 316, 343
See application file for complete search history.

(56) References Cited

U.S. PATENT DOCUMENTS

| 8,135,100 B2 * | 3/2012 | Beukema et al. ............. 375/350 |
| 8,325,792 B2 * | 12/2012 | Sunaga et al. ................ 375/233 |
| 8,416,846 B1 * | 4/2013 | Lin et al. ....................... 375/233 |
| 2008/0198916 A1 * | 8/2008 | Zeng et al. ..................... 375/233 |
| 2009/0316769 A1 | 12/2009 | Hidaka et al. |
| 2009/0316770 A1 * | 12/2009 | Hidaka ........................... 375/233 |
| 2010/0103999 A1 * | 4/2010 | Leibowitz et al. ............ 375/233 |
| 2010/0135378 A1 | 6/2010 | Lin et al. |
| 2010/0289544 A1 * | 11/2010 | Lee et al. ....................... 327/159 |
| 2012/0201289 A1 * | 8/2012 | Abdalla et al. ................ 375/233 |

OTHER PUBLICATIONS

International Search Report and Written Opinion mailed Apr. 30, 2012 for International Patent Application No. PCT/US2011/060813.
Notification Concerning Transmittal of International Preliminary Report on Patentability (Chapter 1 of the Patent Cooperation Treaty), mailed May 30, 2013.

\* cited by examiner

*Primary Examiner* — Hirdepal Singh
(74) *Attorney, Agent, or Firm* — Blakely, Sokoloff, Taylor & Zafman LLP (57) ABSTRACT

Described herein are a method, an apparatus, and a system to compensate inter-symbol interference (ISI) for a signal at a receiver. The apparatus comprises a first logic unit to generate decision feedback equalizer (DFE) coefficients for data samples of a data signal; a second logic unit to generate DFE coefficients for edge samples of the data signal, wherein the DFE coefficients for the edge samples of the data signal are based at least in part on the DFE coefficients for the data samples of the data signal; and a third logic unit to compensate the data and edge samples of the data signal for inter-symbol interference at the data and edge samples of the data signal, wherein the third logic unit to compensate for inter-symbol interference by using the DFE coefficients for the data and edge samples generated by the first and the second logic units respectively.

26 Claims, 11 Drawing Sheets

METHOD, APPARATUS, AND SYSTEM TO COMPENSATE INTER-SYMBOL INTERFERENCE

FIELD OF THE INVENTION

Embodiments of the invention relate generally to the field of processors. More particularly, embodiments of the invention relate to a method, an apparatus, and a system to compensate inter-symbol interference (ISI) on signals.

BACKGROUND

As the speed of input-output (I/O) transceivers increases, noise margin reduces for signals transmitted by an I/O transmitter and received by a corresponding I/O receiver over a transmission line. The term "noise margin" herein refers to an amount corresponding to one or more signal integrity properties (e.g., jitter tolerance, signal eye height and width, overshoot, undershoot, etc.) of a signal that exceed a minimum level for proper reception of the signal at an I/O receiver. A higher noise margin for a signal to be received means that it is easier for the I/O receiver to identify the signal content as compared to a signal having a low noise margin. Noise margin for a signal also degrades due to transmission line losses and/or inter-symbol interference (ISI) on the signal.

ISI is a form of noise on a signal which is caused by successive transmission of data samples on a transmission line. Such successive transmission of data samples interferes with previously transmitted data samples on the same transmission line. Such interference is constructive and/or destructive interference on the transmitted data signal and may result in a blurred signal at the I/O receiver end. A blurred signal at the receiver end caused by ISI has a small signal eye height and width and so it becomes difficult for the I/O receiver to read the received signal. The term "read" herein refers to sampling of the data signal by a clock signal to identify the logical value of the received signal (i.e., the data signal).

ISI also reduces jitter tolerance of the I/O system because ISI takes away timing budget (also called guard-band) from the signals transmitted and received in the I/O system. One method to reduce the effects of ISI (i.e., to compensate for ISI) is to implement equalizers at the I/O receivers for the received data signals. An example of a receiver equalizer is a Decision Feedback Equalizer (DFE). However, application of DFE on data samples of a data signal does not compensate for ISI on edge samples of the data signal. Another example of an equalizer is a linear equalizer such as a Continuous Time Liner Equalizer (CTLE). However, CTLE is ineffective to compensate for ISI on edge and data samples of the data signal because CTLE are sensitive to skews in process technology, temperature, and supply voltage levels.

The term "data samples" herein refers to data points on the data signal sampled by a data clock signal and are used by the DFE to cancel ISI on those data points of the data signal. The term also corresponds to the logical low and high values of the sampled data signal. The term "edge samples" herein refers to data points of the data signal sampled by an edge clock. In some cases, the edge clock is positioned at a crossing point (intersection) of a rising and falling data signal. Such data points are ideally located mid-way of logical high and logical low levels of the data signal.

The edge samples provide a reference point to a clock generation circuit that generates a clock signal and positions the clock signal relative to the received data signal so that the receiver may sample the received data signal properly. However, application of DFE on the data samples of the data signal does not cancel or compensate for ISI on the edge samples of the data signal which are eventually used to position a sampling clock relative to the received data signal.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Embodiments of the invention relate to a method, an apparatus, and a system to compensate inter-symbol interference (ISI) on signals. In one embodiment, an input-output (I/O) receiver is operable to cancel ISI on both data and edge samples of a received data signal. In one embodiment, a traditional decision feedback equalizer (DFE) architecture for applying DFE on data samples of a data signal is modified to apply DFE on edge samples of the data signal. In one embodiment, coefficients for the DFE corresponding to data samples of the data signal are used to generate DFE coefficients for applying DFE on edge samples of the data signal. In such an embodiment, ISI on edge samples of the received data signal is also cancelled i.e., compensated, along with cancelling ISI from data samples of the received data signal.

In one embodiment, the compensated edge samples are then used by a clock generation circuit e.g., a clock data recovery circuit (CDR) to position a sampling clock relative to the received data signal so that the received data signal is sampled with higher timing margin than when the edge samples are not compensated for ISI. By compensating the edge samples for ISI by applying the DFE coefficients of the data samples of the data signal, the overall I/O system performance is improved i.e., the I/O system now has better timing margin and better jitter tolerance. Furthermore, the I/O receiver can now be used for a wide range of data signal frequencies (i.e., wider bandwidth) because the sampling clock can be positioned properly to read the received data signal without any sampling error.

Figure 1:
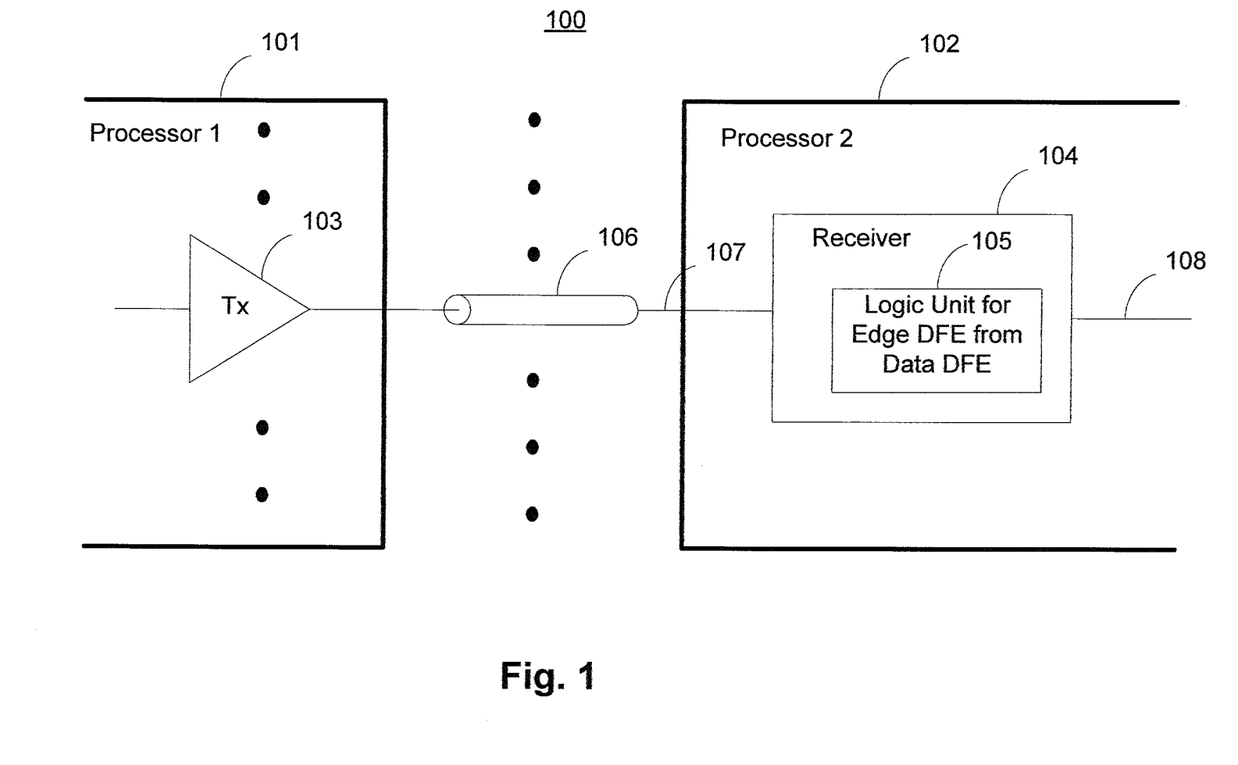
FIG. 1 illustrates a system level architecture with a logic unit comprising a decision feedback equalizer (DFE) for cancelling inter-symbol interference (ISI) on edge and data samples of a signal, according to one embodiment of the invention.

FIG. 1 illustrates a system level architecture 100 with a logic unit 105 comprising a DFE which is operable to cancel ISI on both edge and data samples of a received signal 107, according to one embodiment of the invention. In one embodiment, the system comprises a processor 101 which is communicatively coupled to a processor 102 via a communication link 106. In one embodiment, the communication link 106 is a conductive trace on a motherboard (not shown). In another embodiment, the communication link 106 is a flexible conductive cable to interface with a Universal Serial Bus (USB). In one embodiment, the transmitter 103 and the receiver 104 (also called receiving unit) are a USB based transmitter and receiver. In one embodiment, the USB based transmitter and receiver is a USB3 based transmitter and receiver. In other embodiments, the transmitter 103 and the receiver 104 correspond to other I/O standards such as Serial Advanced Technology Attachment (SATA), Peripheral Component Interconnect Express (PCI-E), etc.

In one embodiment, the communication link 106 is a wireless transmission medium. In one embodiment, the wireless transmission medium is coupled to one or more of a wireless personal area network (WPAN), a wireless local area network (WLAN), and a wireless wide area network (WWAN).

In one embodiment, the processors 101 and 102 are a microprocessor and a corresponding chipset respectively. In one embodiment, the processors 101 and 102 are both microprocessors (CPUs). In one embodiment, the processor 102 is coupled to a memory (Memory 605 of FIG. 6). In one embodiment, the memory is a Dynamic Random Access Memory (DRAM). In one embodiment, the memory is a Static Random Access Memory (SRAM). Referring back to FIG. 1, while the processor 102 is shown to have a receiver 104 and the processor 101 is shown to have a transmitter 103, in one embodiment, both processors 101 and 102 have transmitters and receivers on the same die to send and receive data over one or more communication links.

In one embodiment, the receiver 104 includes a logic unit 105 that is operable to perform DFE on both data and edge samples of the received signal 107. Details of the logic unit 105 are discussed with reference to FIGS. 2-6. The output signal 108 from the receiver 104 is compensated from ISI on both the edge and data samples of the received signal 107. The term "compensate" herein refers to cancelling ISI on the received signal 107. The output signal 108 is then used for further processing (not shown) by the processor 102.

Figure 2A:
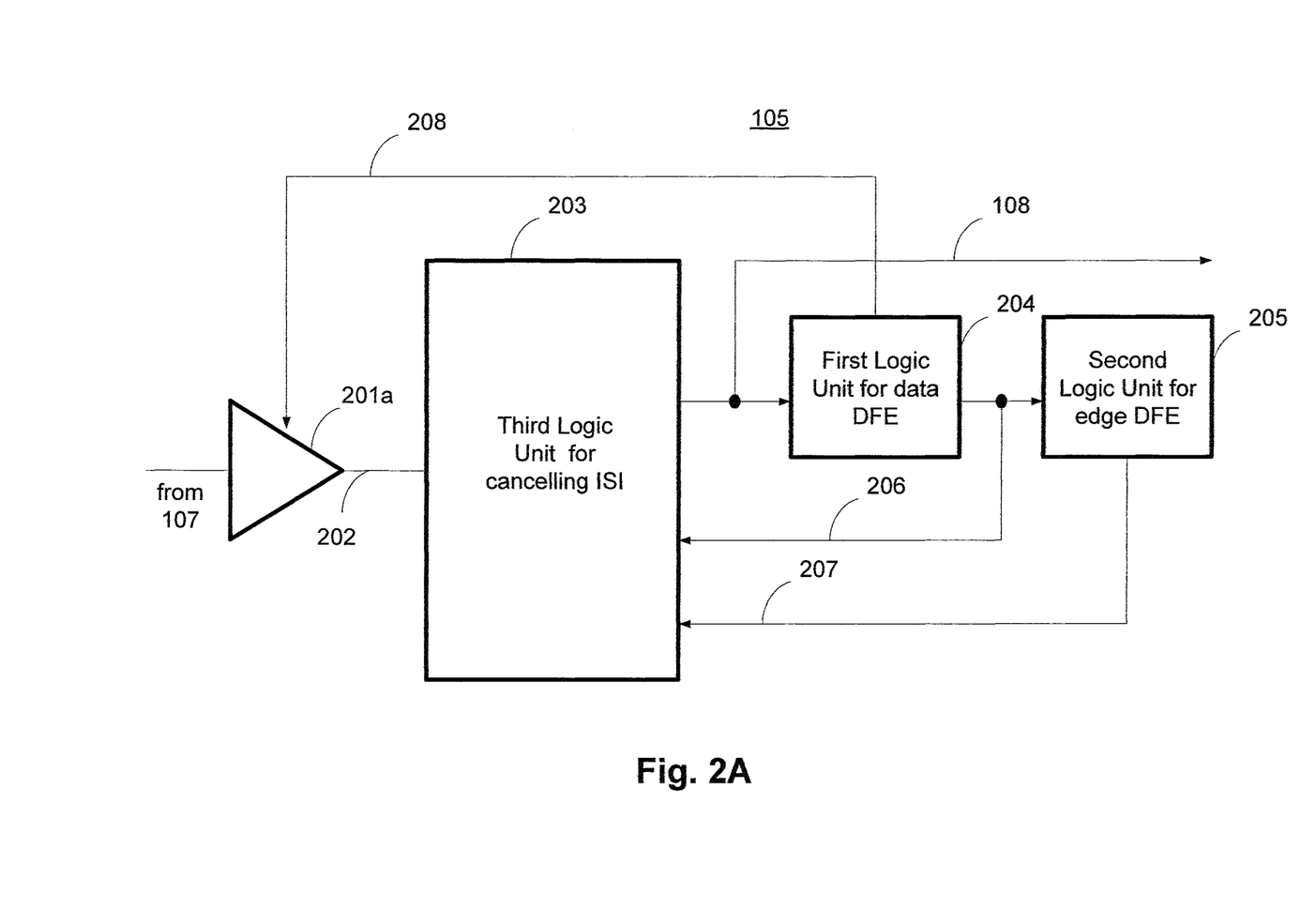
FIG. 2A illustrates the logic unit for cancelling ISI on edge and data samples of a signal, according to one embodiment of the invention.

FIG. 2A illustrates high level details of the logic unit 105 for cancelling ISI on both the edge and data samples of the received signal, according to one embodiment of the invention. FIG. 2A is described with reference to FIG. 1. In one embodiment, the I/O receiver 104 comprises a first logic unit 204 to generate DFE coefficients 206 for data samples of a data signal 107. In one embodiment, the data signal 107 is received by an amplifier 201a that generates an amplified version of the data signal 107 as signal 202. Signal 202, like the data signal 107, contains ISI. In the embodiments discussed herein, signal 202 is also referred to as the data signal 202 because it is an amplified version of the data signal 107 having ISI.

In one embodiment, the amplifier 201a is a variable gain amplifier (VGA) which is operable to vary its output gain by a control signal 208 from the first logic unit 204. One purpose for adjusting/varying the gain of the VGA 201a is to adjust an average level of signal 312 (discussed later with reference to FIG. 3A) in downstream logic unit 203 (e.g., the third logic unit 203) to a reference level (not shown). In one embodiment, a difference between the level of signal 312 (discussed later with reference to FIG. 3A) and the reference level indicates the amount of residual ISI and is used by the logic unit 204 to update the DFE coefficients 206 for the data samples of the data signal 202.

Referring back to FIG. 2A, in one embodiment, the DFE coefficients 206 from the first logic unit 204 are used to implement DFE on the data samples of the data signal 202. The embodiments discussed herein apply a 4-tap DFE. Fewer or more than four taps for DFE may be used without changing the essence of the invention. In one embodiment, a 4-tap DFE on the data samples of the data signal 202 is implemented by the following expression:

$Vdata(i) = Vin(i) - [C1 \times d(i-1) + C2 \times d(i-2) + C3 \times d(i-3) + C4 \times d(i-4)]$, where $Vin(i)$ is the data signal 202 prior to cancelling of ISI from that signal, where C1, C2, C3, and C4 are DFE coefficients 206 generated by the first logic unit 204, where $d(i-1)$, $d(i-2)$, $d(i-3)$, and $d(i-4)$ are previous data samples (data history) of the data signal 202, and where $Vdata(i)$ is the signal (312 of FIG. 3A) which is compensated from ISI on data samples of the signal $Vin(i)$ 202. In one embodiment, the addition and subtraction operations in the above expression that result in generating of the $Vdata(i)$ signal are implemented by a third logic unit 203. In one embodiment, the DFE coefficients 206 are generated by a Least Mean Square (LMS) based equalizer. In other embodiments, other adaptive filters may be used to generate DFE coefficients 206 for the data samples of the data signal 202.

In one embodiment, the I/O receiver 104 further comprises a second logic unit 205, coupled to the first logic unit 204, to generate DFE coefficients 207 for the edge samples of the data signal 202 via the DFE coefficients 206 for the data samples of the data signal 202.

In one embodiment, the second logic unit 205 is operable to receive an estimation factor that represents in absolute terms (i.e., a scalar quantity) an ideal edge sample point on the data signal 202. In one embodiment, the estimation factor is 0.5. In one embodiment, the estimation factor is independent of logical high and logical low levels of the data signal. In one embodiment, the estimation factor is a predetermined factor. In other embodiments, the estimation factor is programmable by hardware and/or software.

In one embodiment, the DFE coefficients for the edge samples 207 of the data signal 202 are: (estimation factor×C1), (estimation factor×(C1+C2)), (estimation factor×(C2+C3)), and (estimation factor×(C3+C4)) for a 4-tap DFE configuration.

In one embodiment, the I/O receiver 104 comprises the third logic unit 203, coupled to the first and second logic units 204 and 205 respectively, to compensate the data and edge samples of the data signal 202 for ISI at the data and edge sampling time points of the data signal 202. In one embodiment, a 4-tap DFE on the edge samples of the data signal 202 that applies the DFE coefficients of the data samples of the data signal 202 is implemented by the following expression:

Vedge(i)=Vin(i)−estimation factor×[C1×d(i)+(C1+C2)×d(i−1)+(C2+C3)×d(i−2)+(C3+C4)×d(i−3)], where Vin(i) is the signal 202 prior to cancelling of ISI from that signal, where C1, C2, C3, and C4 are DFE coefficients 206 of the data samples generated by the first logic unit 204, where d(i−1), d(i−2), and d(i−3) are previous data samples (data history) of the data signal 202, where d(i) is the current data sample of the data signal 202, where the estimation factor is a predetermined factor (discussed above) or a programmed factor, where (estimation factor×C1), (estimation factor×(C1+C2)), (estimation factor×(C2+C3)), and (estimation factor×(C3+C4)) are DFE coefficients for the edge samples 207 of the data signal 202 for a 4-tap DFE configuration, and where Vedge(i) (313 of FIG. 3A) is the signal which is compensated from ISI on the edge samples of the signal Vin(i) 202.

In one embodiment, the addition and subtraction operations in the above expression that result in the generation of the Vedge(i) signal are implemented by the third logic unit 203. In one embodiment, the Vedge(i) signal is used as an input to a clock generation circuit that positions the clock signal for sampling the data signal 202 so that it is properly read/sampled. In one embodiment, the Vedge(i) signal is an analog signal which is converted to a corresponding digital signal before being used by the clock generation circuit. The above embodiment is discussed in more detail with reference to FIG. 3A.

Figure 2B:
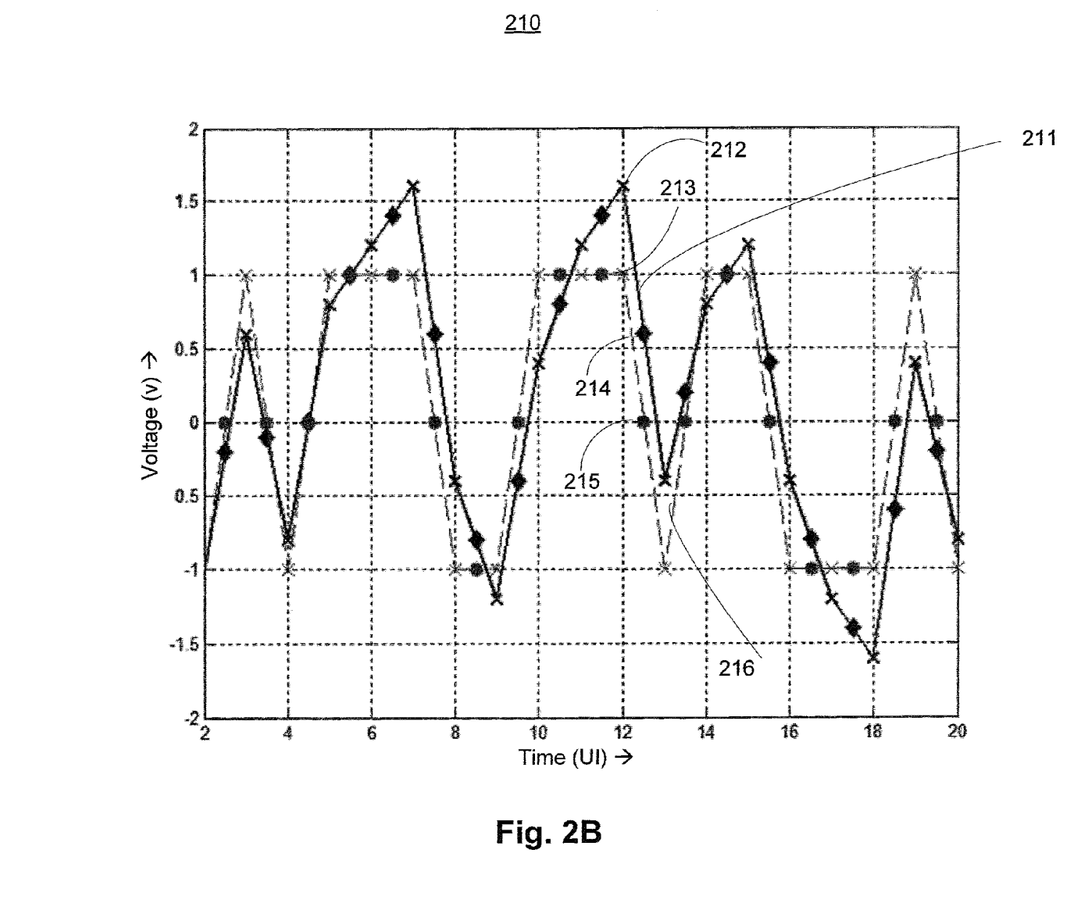
FIG. 2B illustrates an input waveform to the logic unit of FIG. 2A and an output waveform from the logic unit, according to one embodiment of the invention.

FIG. 2B illustrates a differential input signal 107 to the logic unit 105 and an output waveform 216 (same as 108) from the logic unit 105, according to one embodiment of the invention. The x-axis of the plot 210 is in time domain expressed as unit intervals (UI) while the y-axis is in voltage (Volts) domain. In one embodiment, the logic unit 105 is operable to receive a single-ended input signal 107 with ISI and to cancel the ISI for both data and edge samples of the single-ended input signal 107 without changing the essence of the embodiments of the invention.

Signal 211, which is the same as data signal 202, represents a differential input signal with ISI. Signal point 212 is a data sample of the signal 202 representing a logical high level before any DFE is applied to cancel ISI on that signal point (also called data sample). Signal point 213 represents a data sample of the signal 202 after applying DFE to the data sample 212. Signal point 214 represents an edge sample of the signal 202 when no DFE is applied to the edge sample of the data signal 202.

Figure 3A:
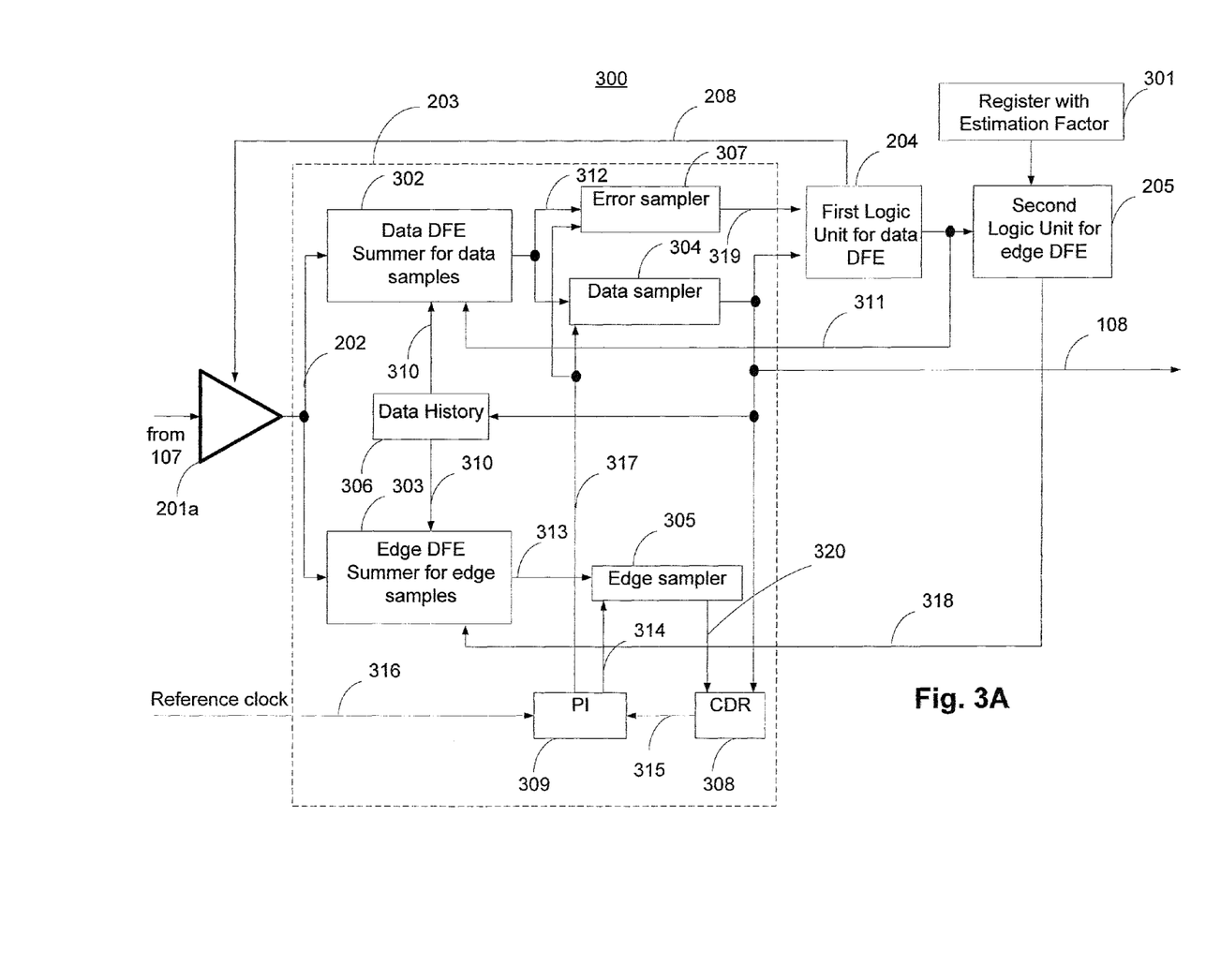
FIG. 3A illustrates logic units to apply DFE on edge and data samples of a data signal, according to one embodiment of the invention.

In one embodiment, the edge sample 214 is used to identify the edge of a data signal and, thus, a reference edge for a clock data recovery circuit (or a clock generation circuit 308 of FIG. 3A). The reference edge is then used to generate a sampling clock signal so that that clock signal transitions (from high to low or low to high level) in the middle of the eye width (in time domain) of the data signal 202. If ISI is not cancelled from the edge sample 214, the clock generation circuit or clock recovery circuit 308 of FIG. 3A will position a sampling clock away from the middle of the eye width (in time domain) of the data signal 202 and thus possibly result in sampling an incorrect value of the data signal 202 due to ISI noise on the data signal 202.

The signal 215 represents an edge sample corresponding to the signal 202 after DFE is applied to the edge sample 214 via the logic unit 105. By applying DFE to the edge sample 214, a clock generation circuit has a proper reference to generate a sampling clock in the middle of the eye width (e.g., in time domain) of the signal 202. Signal 216 represents the output signal 108 reconstructed from the data and edge samples 213 and 215 respectively after applying DFE to the data and edge samples 212 and 214 respectively. In the above embodiment, ISI is cancelled (by the logic unit 105) for both the data and edge samples 212 and 214—data and edge samples 213 and 215 respectively are without ISI.

Figure 2C:
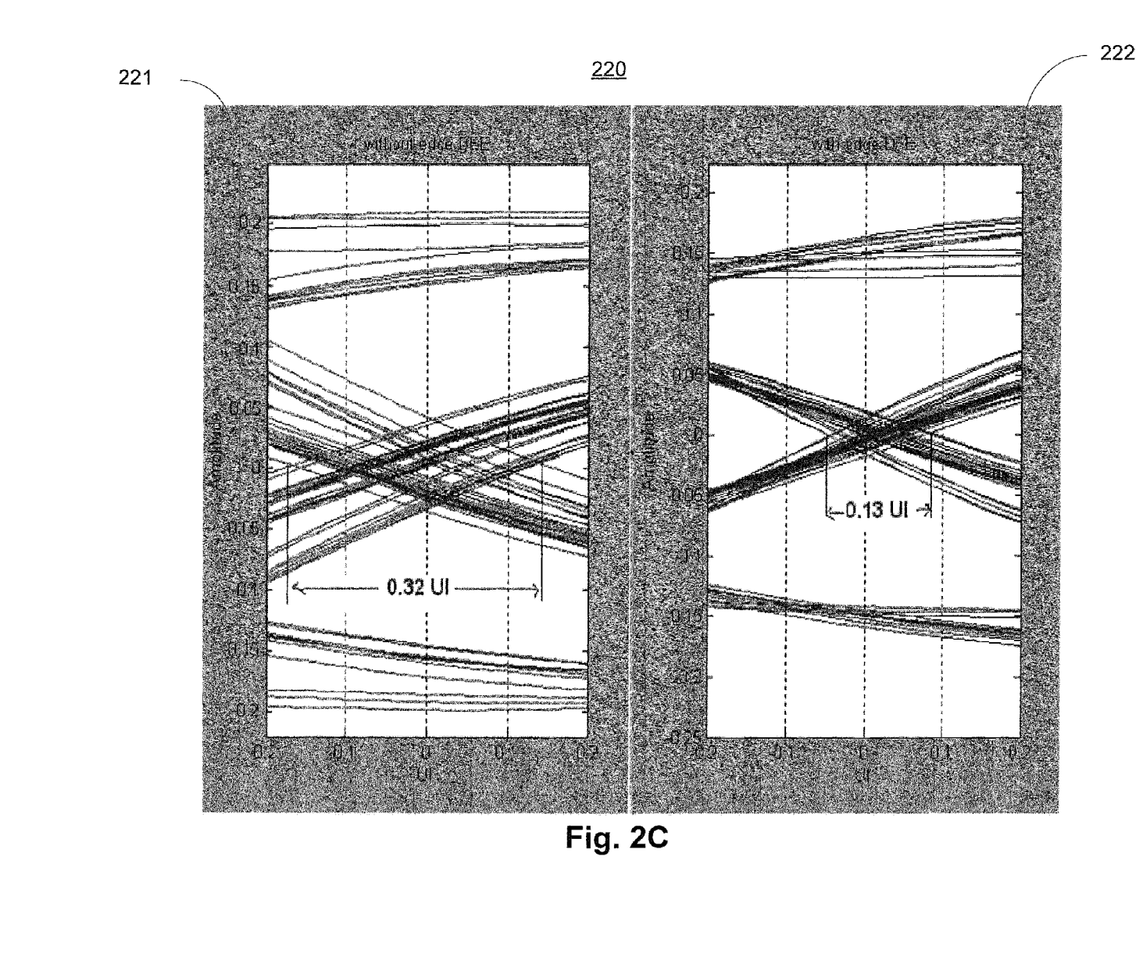
FIG. 2C illustrates a pair of eye diagrams of reconstructed data signals at an input of a data sampler showing a comparison of a prior art application of DFE on data samples of a data signal only versus an application of DFE on both the edge and data samples of the data signal, according to one embodiment of the invention

FIG. 2C illustrates a pair of eye diagrams 220 of reconstructed data signals at an input of a data sampler showing a comparison of a prior art application of DFE on data samples of a data signal only versus an application of DFE on both the edge (214) and data (212) samples of the signal 202, according to one embodiment of the invention.

The term "reconstructed" signal herein refers to the signal prior to being sampled by the data and/or edge samplers (e.g., 304, 305 of FIG. 3A) and which is referenced to the clock signals (e.g., 314, 317 of FIG. 3A) which are generated by the clock generation unit (PI 309, CDR 308 of FIG. 3A).

Referring back to FIG. 2C, waveform 221 shows a traditional (prior art) reconstructed eye diagram after applying DFE on data samples only. While the waveform 221 is compensated for ISI on the data samples of a data signal, the crossing points of the signals are spread over a distance of 0.32 unit intervals (UI). The crossing points of the signals represent ISI induced signal jitter (noise) that is not tracked by a clock data recovery circuit. A clock data recovery circuit uses the crossing points to determine a reference edge signal and then to generate clock signals, for sampling data signals, based on the reference edge signal. A wider spread of crossing points, as showing in waveform 221, causes incorrect sampling of received data signal.

Since the crossing points of the signals of waveform 221 are spread over a wide distance (0.32 UI) compared to the spread of crossing points of signals of waveform 222, a clock data recovery circuit of a traditional receivers has a smaller jitter tolerance compared to the clock data recovery circuit 308 of the embodiments of the invention.

Waveform 222 represents the reconstructed data signal (312 of FIG. 3A) of the receiver 104 which applies DFE to both the edge and data samples of the data signal 202, according to one embodiment. In such an embodiment, the crossing points of the reconstructed signal (312 of FIG. 3A) are spread over a shorter (narrower) distance of 0.13 UI. As mentioned above, in one embodiment, the clock data recovery circuit uses the crossing points to determine a reference edge signal and then to generate clock signals, for sampling data signals, based on the reference edge signal. A narrower spread of crossing points, as showing in waveform 222, causes correct sampling of received data signal over a wide bandwidth.

Since the crossing points of the signal (312 of FIG. 3A) of waveform 222 are spread over a shorter distance than the spread of waveform 221 (prior art), the receiver 104 of the present embodiments tolerates more internal and/or external jitter on the data signal 202 than the prior art.

FIG. 3A illustrates logic units 300 to apply DFE on both the edge and data samples of the data signal 202, according to one embodiment of the invention. FIG. 3A is discussed with reference to FIGS. 1-2. In one embodiment, the third logic unit 203 is operable to receive DFE coefficients 311, from the first logic unit 204, for applying DFE on the data samples of the data signal 202. In one embodiment, the third logic unit 203 is operable to receive, from the second logic unit 205, the DFE coefficients 318 for the edge samples of the data signal 202.

In one embodiment, the estimation factor which is used to scale (by multiplying) the DFE coefficients 318 for the edge samples is stored in a register 301. In one embodiment, the register 301 is programmable via an operating system (not shown). In one embodiment, the third logic unit 203 applies the DFE coefficients for the data and edge samples (311 and 318) on the data signal 202 to generate an output signal 108 which is compensated for ISI. The output signal 108 is then used by a downstream logic (not shown) to process the content of the output signal 108.

In one embodiment, the third logic unit 203 comprises summer logic units 302 and 303 for generating Vdata(i) and Vedge(i) signals, respectively. In one embodiment, the summer logic unit 302 (first DFE summation logic unit) is operable to generate a corrected data sample signal Vdata(i) 312 from the DFE coefficients for the data samples 311 of the data signal 202 and previous data samples 310 of the data signal 202. In one embodiment, the summer logic unit 303 (second DFE summation logic unit) is operable to generate a corrected edge sample signal Vedge(i) 313 from the DFE coefficients for the edge samples 318 of the data signal 202 and the previous data samples 310 of the data signal 202.

So as not to obscure the embodiments of the invention, the detail implementation of the summer logic units are not shown. A person skilled in the art can use digital and/or analog summers to implement the mathematical function of adding/subtracting to generate Vdata(i) 312 and Vedge(i) 313 signals.

As discussed above with reference to FIG. 2A, $Vdata(i) = Vin(i) - [C1 \times d(i-1) + C2 \times d(i-2) + C3 \times d(i-3) + C4 \times d(i-4)]$ while $Vedge(i) = Vin(i) - \text{estimation factor} \times [C1 \times d(i) + (C1+C2) \times d(i-1) + (C2+C3) \times d(i-2) + (C3+C4) \times d(i-3)]$, where Vin(i) is the signal 202, Vdata(i) is signal 312 and Vedge(i) is signal 313. In one embodiment, the data history signal 310 which comprises data signals d(i), d(i−1), d(i−2), and d(i−3) is stored in registers by the data history logic unit 306. In one embodiment, the data history logic unit 306 is a shift register having a chain of storage devices such as flip-flops or latches, or any other memory devices, to store the data history.

In one embodiment, the third logic unit 203 includes an error sampling logic unit 307 to determine whether the corrected (re-constructed) data Vdata(i) signal 312, which is being compensated for ISI, is above or below one or more reference levels. In such an embodiment, the error sampling logic unit 307 is operable to receive the corrected (re-constructed data) Vdata(i) signal 312 and the one or more reference signal levels (not shown), wherein one of the reference levels is a high reference level corresponding to a logical high level while the other reference level is a low reference level corresponding to a logical low level.

In one embodiment, when all the ISI is compensated, Vdata(i) signal 312 is at the reference signal levels corresponding to logical low or logical high levels. In one embodiment, the output sampled error signal 319 from the error sampling unit 307 indicates whether the sampled Vdata(i) signal 108 is above or below the reference levels.

In one embodiment, the first logic unit 204 receives the sampled error signal 319 and the sampled Vdata(i) signal 108 and uses them to update the DFE coefficients 311 for the data samples of the data signal 202. In one embodiment, the first logic unit 204 is implemented as a LMS equalizer. In one embodiment, the new DFE data sample coefficients 311 are received by the second logic unit 204 to update the DFE coefficients 318 for the edge samples.

In one embodiment, the loop from the first and second logic units (204 and 205) to the third logic unit (203) continues to generate updated DFE coefficients for the data and edge samples (311 and 318 respectively) until the sampled error output signal 307 indicates no further change is needed to Vdata(i) and/or Vedge(i) signals (312 and 313 respectively). In such an embodiment, the first and second logic units (204 and 205) continue to generate updated DFE coefficients for the data and edge samples (311 and 318 respectively) even when error is close to zero or is zero. In one embodiment, the error may toggle around an equilibrium level e.g., a zero level. The term "close" herein refers to an error which is not more than 10% from zero error level.

In one embodiment, the third logic unit 203 is operable to sample the signals Vdata(i) 312 and Vedge(i) 313 via data and edge sampling units 304 and 305 respectively. In one embodiment, the sampling logic units 304 and 305 are operable to receive sampling clock signals 317 (also referred to as a first clock signal) and 314 (also referred to as a second clock signal) respectively from a clock generation logic unit (not shown in its entirety). In one embodiment, the sampling logic units 304 and 305 are implemented as flip-flops. In other embodiments, the sampling logic units 304 and 305 are implemented as sample and hold circuits. In other embodiments, other implementations of the sampling logic units 304 and 305 may be used without changing the essence of the invention.

In one embodiment, the clock generation logic unit comprises a phase interpolator (PI) 309. In one embodiment, the PI 309 comprises a delay line (not shown) to delay a clock signal 315 to generate various delayed versions of the clock signal 315 via interpolations between clock signals.

The term "delay" herein refers to delay in time domain that results in changing a phase of the signal. In one embodiment, the delay line (not shown) is part of a delay locked loop (DLL) that locks a delay line with respect to a reference clock signal 316 to generate delayed clock signals 317 and 314 for the data and edge sampling logic units 304 and 305 respectively.

In one embodiment, the clock generation logic unit comprises a clock data recovery (CDR) circuit 308 that is operable to receive signals 320 and 108, which are the sampled outputs of Vedge(i) 313 and Vdata(i) 312 respectively, to generate a control signal 315 for the PI 309. In one embodiment, the control signal 315 to the PI 309 is used to adjust the delay between the output clock signals 317 and 314 from the PI 309 relative to the input clock signal 316. In one embodiment, the CDR circuit 308 is operable to instruct the PI 309 via the control signal 315 to generate the delayed clock signals 317 and 314 for the data and edge sampling logic units 304 and 305 respectively such that the delayed clock signal 317 is positioned in the middle of the eye width (in time domain) of the Vdata(i) signal 312, and clock signal 314 is positioned at the edge of the eye (near 0 UI point of waveform 222 of FIG. 2C).

Referring back to FIG. 3A, in the above embodiment, the CDR 308 is operable to receive the sampled edge and data signals 320 and 108 respectively to determine the position of the clock signal 317 relative to the data signal 312. In such an embodiment, the CDR 308 is operable to instruct the PI 309, via the control signal 315, to position the clock signal 314 to sample the edge signal 313, and the clock signal 317 to sample data signal 312.

In one embodiment, the clock signals 317 and 314 are typically about half UI apart from one another so that the clock signal 317 aligns (in time domain) with the center of the data eye of signal 312, and the clock signal 314 aligns (in time domain) with the edge of an eye of the signal 313. So as not to obscure the embodiments of the invention, detail implementation of the CDR circuit 308 are not discussed.

Figure 3B:
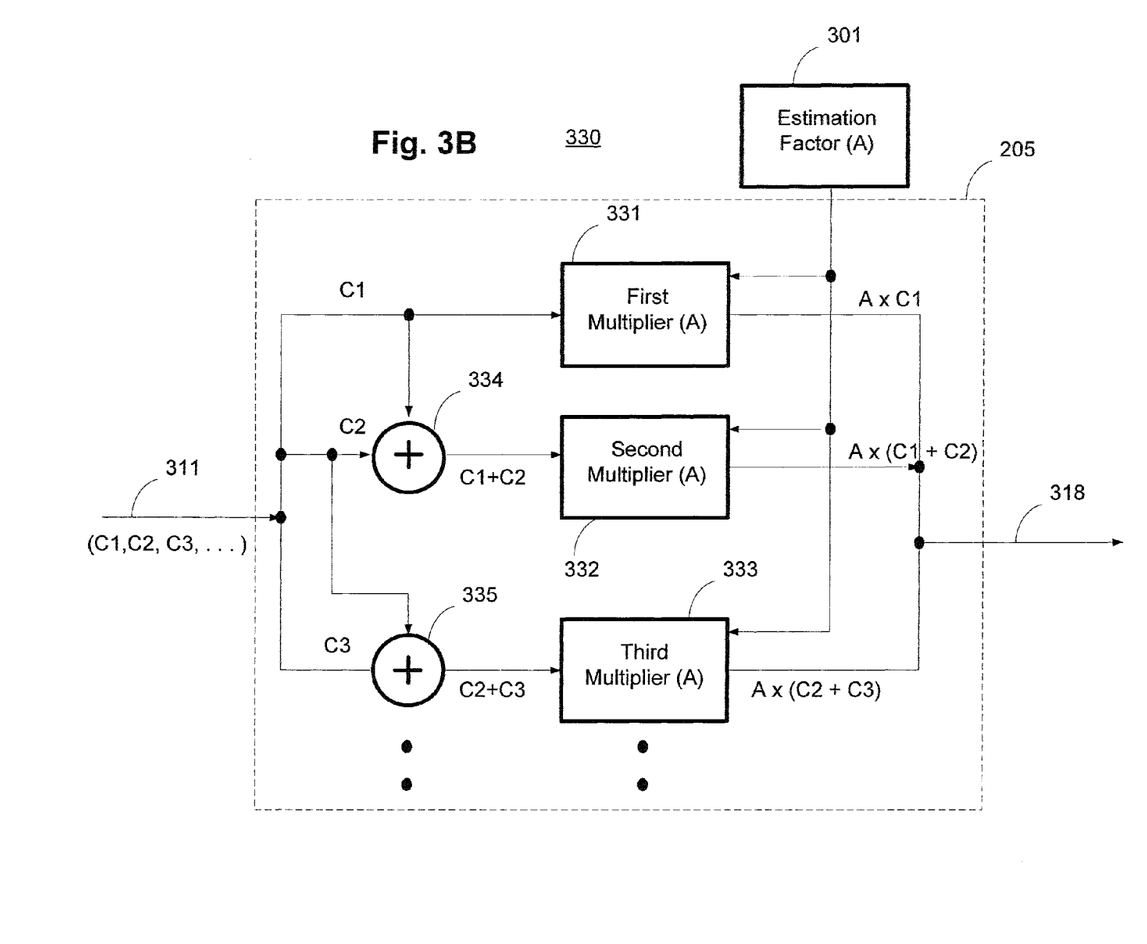
FIG. 3B illustrates logic units to apply DFE on edge samples of a signal via DFE coefficients of data samples of the data signal, according to one embodiment of the invention.

FIG. 3B illustrates a logic level diagram 330 comprising the second logic unit 205 to generate DFE coefficients for the edge samples of the data signal 202 via DFE coefficients of the data samples of the data signal 202, according to one embodiment of the invention. In one embodiment, the input to the second logic unit 205 are DFE coefficients of the data samples of the data signal 202 i.e., C1, C2, C3, .... In one embodiment, the output of the second logic unit 205 includes DFE coefficients of the edge samples of the data signal 318 i.e., A×C1, A×(C1+C2), A×(C2+C3), ..., where 'A' is the estimation factor from the estimation factor logic unit 301, and where C1, C2, C3, are DFE coefficients of the data samples of the data signal. In one embodiment, the second logic unit is operable to apply linear approximation to the DFE coefficients for the data samples 311 of the data signal 202 to generate the DFE coefficients 318 for the edge samples of the data signal 202.

In one embodiment, the second logic unit 205 comprises a first multiplier 331 which is operable to multiply a first data DFE coefficient C1 of 311, from the DFE coefficients 311 for the data samples, with an estimation factor 'A' from the estimation factor logic unit 301. In the above embodiment, the first multiplier 331 is operable to generate a first edge DFE coefficient (A×C1).

In one embodiment, the second logic unit 205 further comprises an adder logic unit 334 to add the first data DFE coefficient C1 of 311 with a second data DFE coefficient C2, from the DFE coefficients 311 for the data samples of the data signal 202, to generate a summation signal i.e., C1+C2. In one embodiment, the summation signal (C1+C2) is then multiplied by a second multiplier 332 to multiply the estimation factor 'A' from the estimation factor logic unit 301 with the summation signal (C1+C2) to generate a second edge DFE coefficient i.e., A×(C1+C2), wherein the DFE coefficients for the edge samples of the data signal includes the first and second edge DFE coefficients.

In one embodiment, the second logic unit 205 comprises another adder logic unit 335 to add the second data DFE coefficient C2 of 311 with the second data DFE coefficient C2 from the DFE coefficients for the data samples of the data signal 311 to generate another summation signal i.e., C2+C3. In one embodiment, the other summation signal (C2+C3) is then multiplied by a third multiplier 333 to multiply the estimation factor 'A' from the estimation factor logic unit 301 with the other summation signal (C2+C3) to generate a third edge DFE coefficient i.e., A×(C2+C3).

In one embodiment, depending on the number of taps for applying DFE on data samples of the data signal 202, a corresponding number of adders and multipliers are included in the second logic unit 205 to generate DFE coefficients for the edge samples 318 from the DFE coefficients of the data samples 311 of the data signal 202. In one embodiment, the number of edge DFE coefficients may be fewer or more that the number of DFE taps for applying DFE on the data samples of the data signal 202.

In one embodiment, the process of generating the DFE coefficients for the edge samples 318 is a linear process. In one embodiment, the adders 334 and 335 perform the summation operation after the multiplying operations by the multipliers 331, 332, and 333. In one embodiment, the second logic unit 205 comprises multipliers to multiply the estimation factor 'A' with the DFE coefficients of the data samples to generate a multiplied result. In such an embodiment, the multiplied result is then added together with multiplied results from other multipliers to generate DFE coefficients of edge samples 318 from DFE coefficients of data samples 311.

Figure 4:
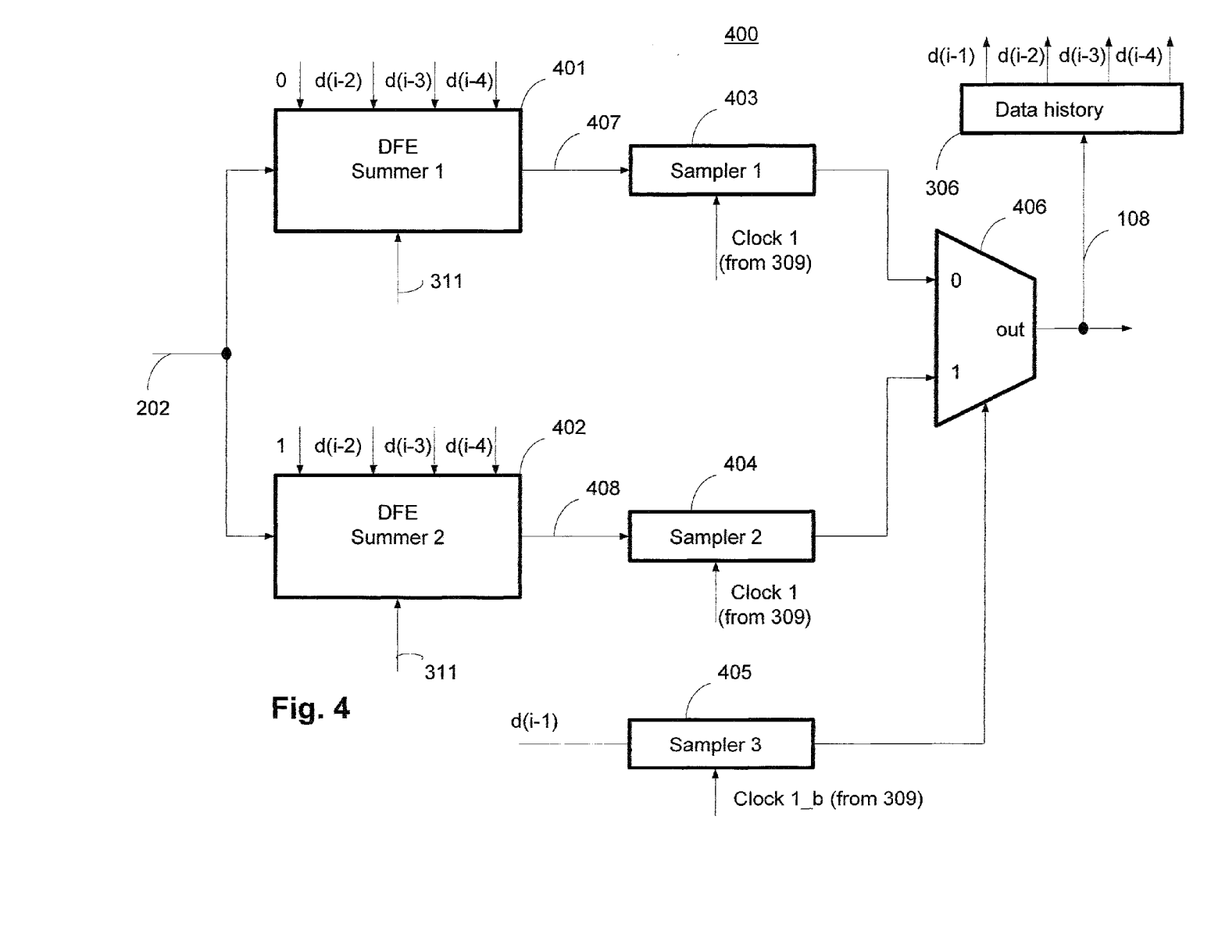
FIG. 4 illustrates a look-ahead logic unit to eliminate any timing violation in the data samples of the signal, according to one embodiment of the invention.

FIG. 4 illustrates a look-ahead logic unit 400 to eliminate any timing violation from data sampler 304 to DFE summer logic units 302 and 303, according to one embodiment of the invention. In one embodiment, the summer logic unit 302 and the data sampler 304 are replaced by the look-ahead logic unit 400 to generate the output signal 108, wherein the output signal 108 is without timing violation.

While the look-ahead logic unit 400 is illustrated for data DFE aspect of the third logic unit 203, it can also be used for edge DFE aspect of the third logic unit 203. In such an embodiment, the look-ahead logic unit 400 replaces the summer logic unit 303 and the edge sampler 305. In one embodiment, the look-ahead logic unit 400 is used for both the data DFE and edge DFE together.

In one embodiment, the look-ahead logic unit 400, which replaces the summer logic unit 302 and data sampler 304, is operable to receive the data samples (d(i−1), d(i−2), d(i−3), d(i−4), ...) of the data signal 202 from the data history unit 306. In the above embodiment, the look-ahead logic unit 400 is further operable to receive DFE coefficients 311 from a feedback path connecting the first logic unit 204 to the third logic unit 203. In such an embodiment, the look-ahead logic unit 400 is operable to select a corrected data sample signal 108 from a plurality of corrected data sample signals (407 and 408), and wherein the selected corrected data sample signal 108 is without timing violation.

In one embodiment, the look-ahead logic unit 400 comprises two summer logic units 401 and 402, wherein the first summer logic unit 401 generates a corrected data sample signal 407 by applying '0' for the to be d(i−1) data sample, and wherein the second summer logic unit 402 generates a corrected data sample signal 408 by applying '1' for the to be d(i−1) data sample. In one embodiment, the two corrected data sample signals, 407 and 408, are sampled by samplers 403 and 404 via clock signals from the PI 309. In one embodiment, the output of the samplers 403 and 404 is multiplexed by a multiplexer 406, wherein the multiplexer 406 is controlled by a select signal which is an output of a sampler 405 that samples d(i−1) (either a logical zero or one level) via an inverse of the clock signal 317. The term "inverse" herein refers to a 180 degree phase shift to a signal. The output of the multiplexer 406 is 108 and is without timing violation.

In one embodiment, when the look-ahead logic unit 400 replaces the edge DFE summer 303 and the edge sampler 305, then the output of the look-ahead logic unit 400 is signal 320 instead of 108. In such an embodiment, the inputs to the first and second summer logic units (401 and 402) are data samples 0, d(i−1), d(i−2), and d(i−3), and 1, d(i−1), d(i−2), and d(i−3), respectively. In one embodiment, the first and second summer logic units (401 and 402) receive the edge samples 318 instead of the data samples 311. In the above embodiment, the sampler 405 receives signal d(i) instead of signal d(i−1).

Figure 5A:
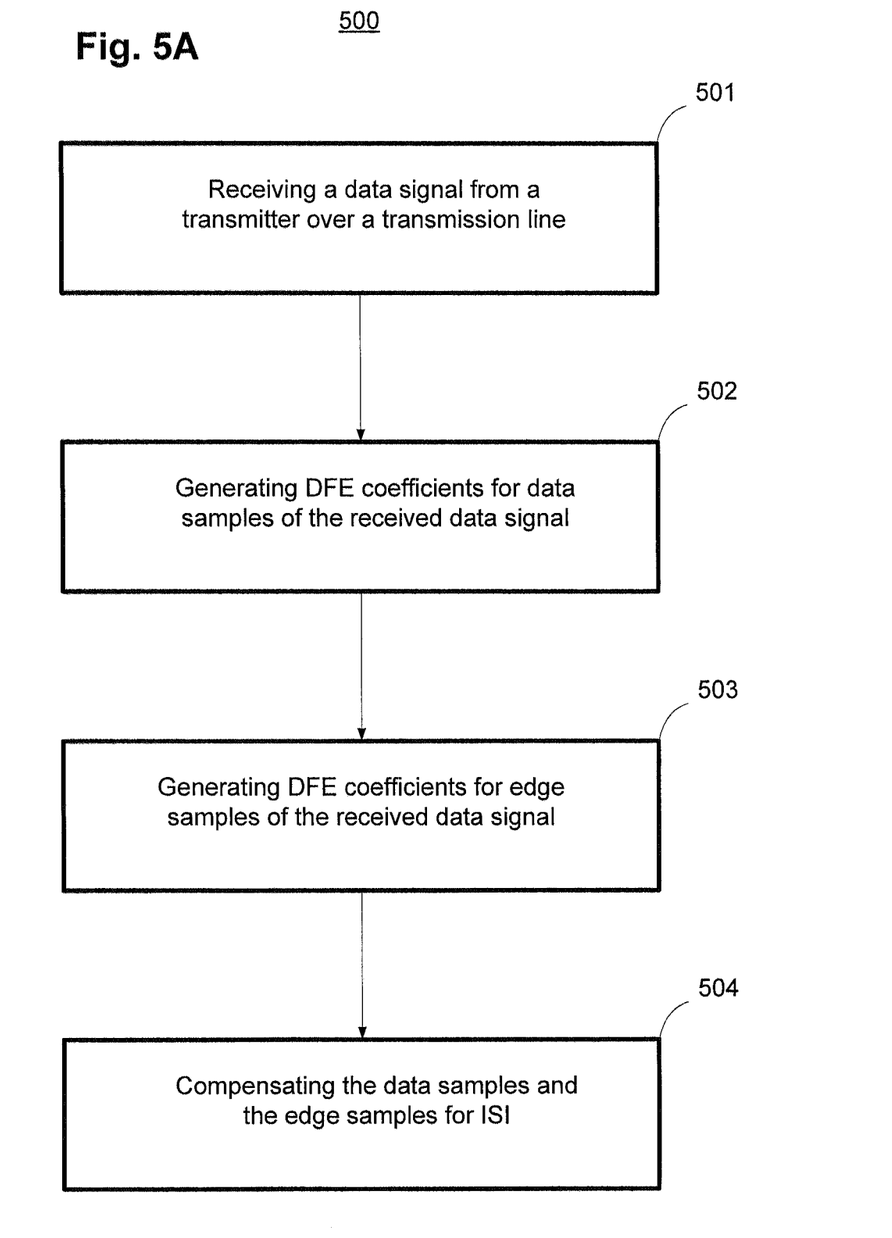
FIG. 5A illustrates a high level flowchart for cancelling ISI on edge and data samples of a signal, according to one embodiment of the invention.

FIG. 5A illustrates a high level flowchart 500 for cancelling ISI on the edge and data samples of a signal 202, according to one embodiment of the invention. The method flow-chart is explained with reference to FIGS. 1-3.

At block 501, the receiver 104 receives a data signal 107 from a transmitter 103 over a transmission line 106. The data signal 107 is amplified to generate an amplified signal 202 which is then used for further processing. At block 502, the first logic unit 204 generates DFE coefficients 311 for the data samples of the received data signal 202.

At block 503, DFE coefficients 318 for the edge samples of the received data signal 202 are generated by the second logic unit 205 via the DFE coefficients for the data samples 311 of the received data signal 202. At block 504, the data and edge samples 108 and 320 of the received data signal 202 are compensated for ISI at the data and edge samples of the received data signal 202, wherein compensating for the ISI is via the DFE coefficients for the data and edge samples 311 and 318 respectively.

Figure 5B:
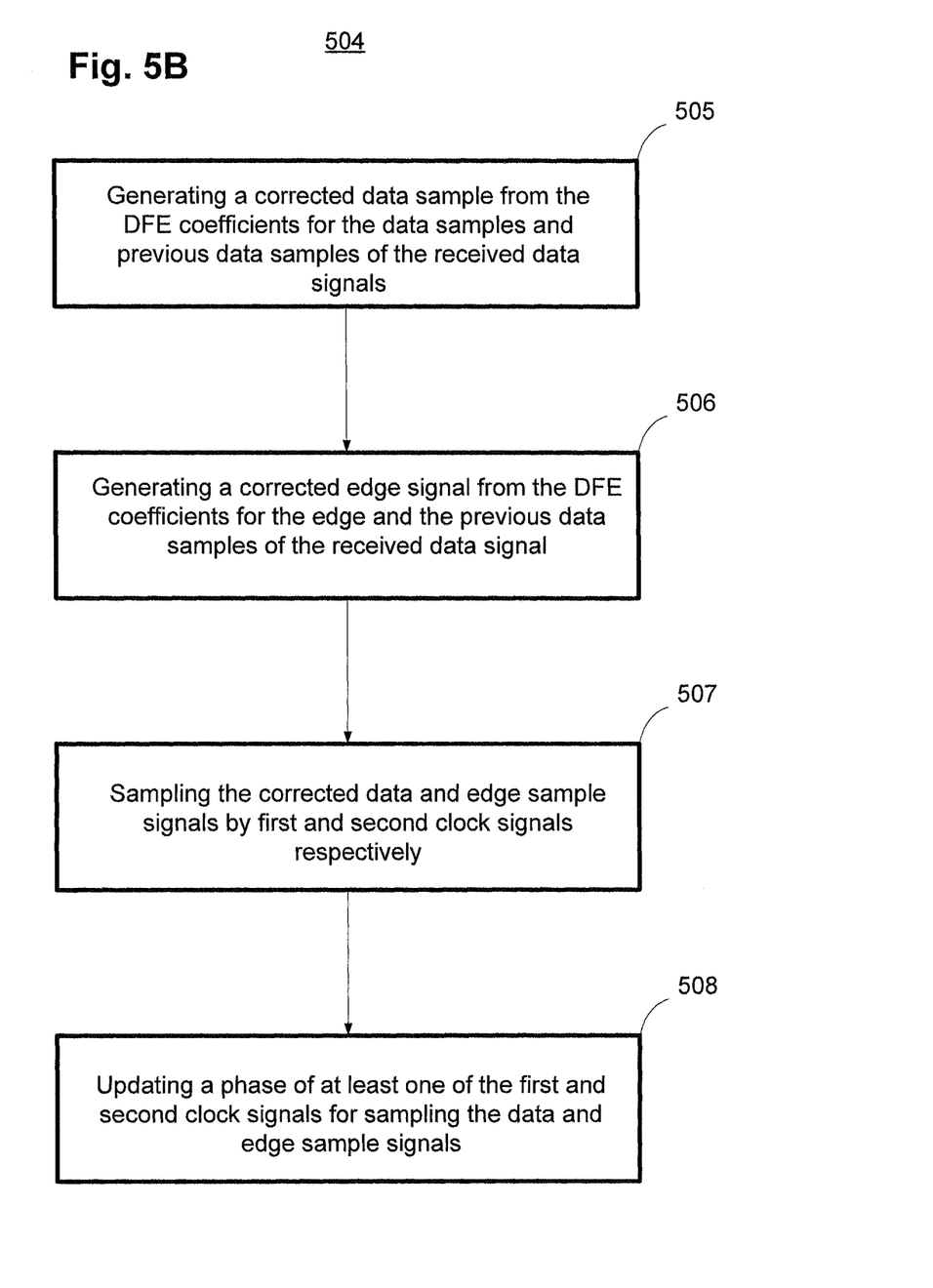
FIG. 5B illustrates a detailed flowchart for cancelling ISI on edge and data samples of a signal, according to one embodiment of the invention.

FIG. 5B illustrates a detailed flowchart of the block 504 of FIG. 5A for cancelling ISI on the edge and data samples of the received signal 202, according to one embodiment of the invention.

At block 505, a corrected data sample 312 is generated from the DFE coefficients for the data samples 311 of the received data signal 202 and the previous data samples 310 of the received data signal 202. At block 506, a corrected edge sample signal 313 is generated from the DFE coefficients for the edge samples 318 of the received data signal 202 and the previous data samples 310 of the received data signal 202. At block 507, the corrected data and edge sample signals 312 and 313 are sampled by samplers 304 and 305 via clock signals 317 (first clock signal) and 314 (second clock signal) respectively. At block 508, a phase of at least one of the clock signals 317 (first clock signal) and 314 (second clock signal) is updated via the CDR 308 and the PI 309, wherein the clock signals 317 (first clock signal) and 314 (second clock signal) are for sampling the data and edge sample signals 312 and 313 respectively. In one embodiment, the phases of both clock signals 317 (first clock signal) and 314 (second clock signal) is updated via the CDR 308 and the PI 309.

Figure 5C:
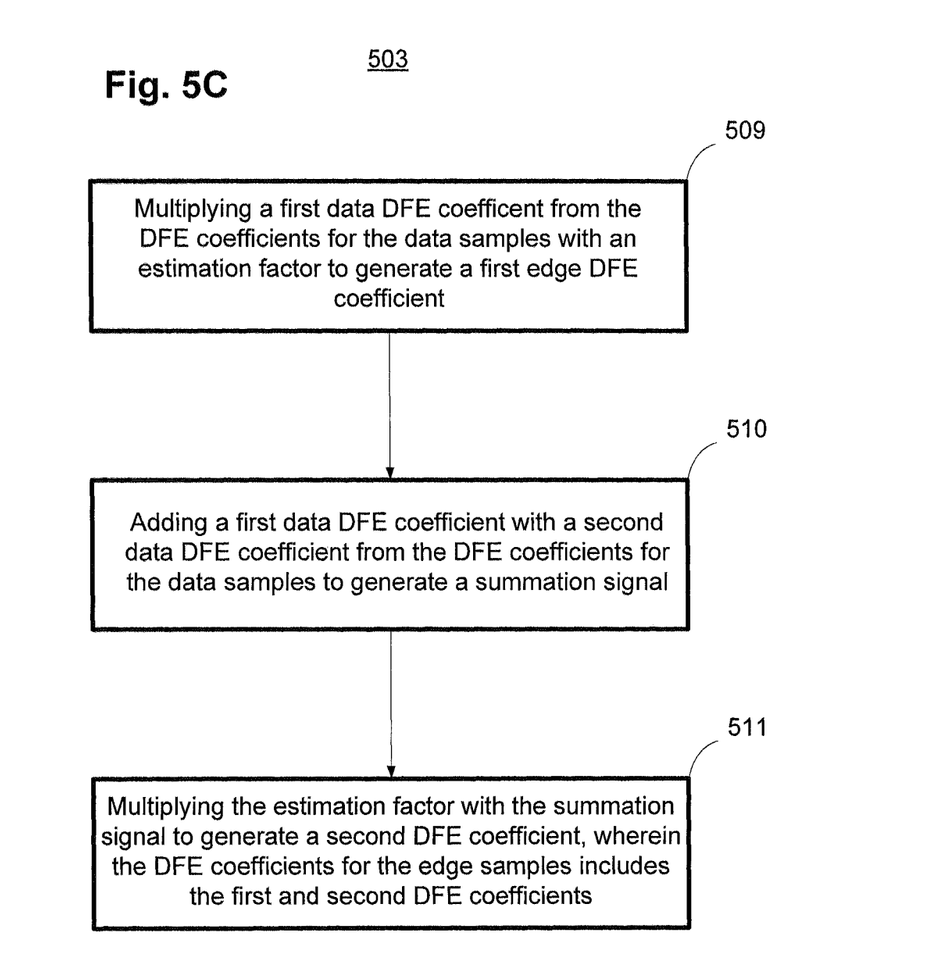
FIG. 5C illustrates a flowchart for generating DFE coefficients for edge samples of a signal, according to one embodiment of the invention.

FIG. 5C illustrates a flowchart that described the details of block 503 of FIG. 5A for generating DFE coefficients for the edge samples 318 of the received signal 202, according to one embodiment of the invention.

At block 509, a first data DFE coefficient (C1) from the DFE coefficients 311 (C1, C2, C3, C4, ... ) for the data samples is multiplied by the multiplier 331 with the estimation factor 'A' to generate a first edge DFE coefficient (A×C1). At block 510, the first data DFE coefficient (C1) is added by the adder 334 with a second data DFE coefficient (C2) from the DFE coefficients 311 (C1, C2, C3, C4, ... ) for the data samples of the received data signal 202 to generate a summation signal (C1+C2).

At block 511, the estimation factor 'A' is multiplied by the multiplier 332 with the summation signal (C1+C2) to generate a second edge DFE coefficient (A×(C1+C2)), wherein the DFE coefficients for the edge samples 318 of the received data signal 202 includes the first and second edge DFE coefficients.

Figure 6:
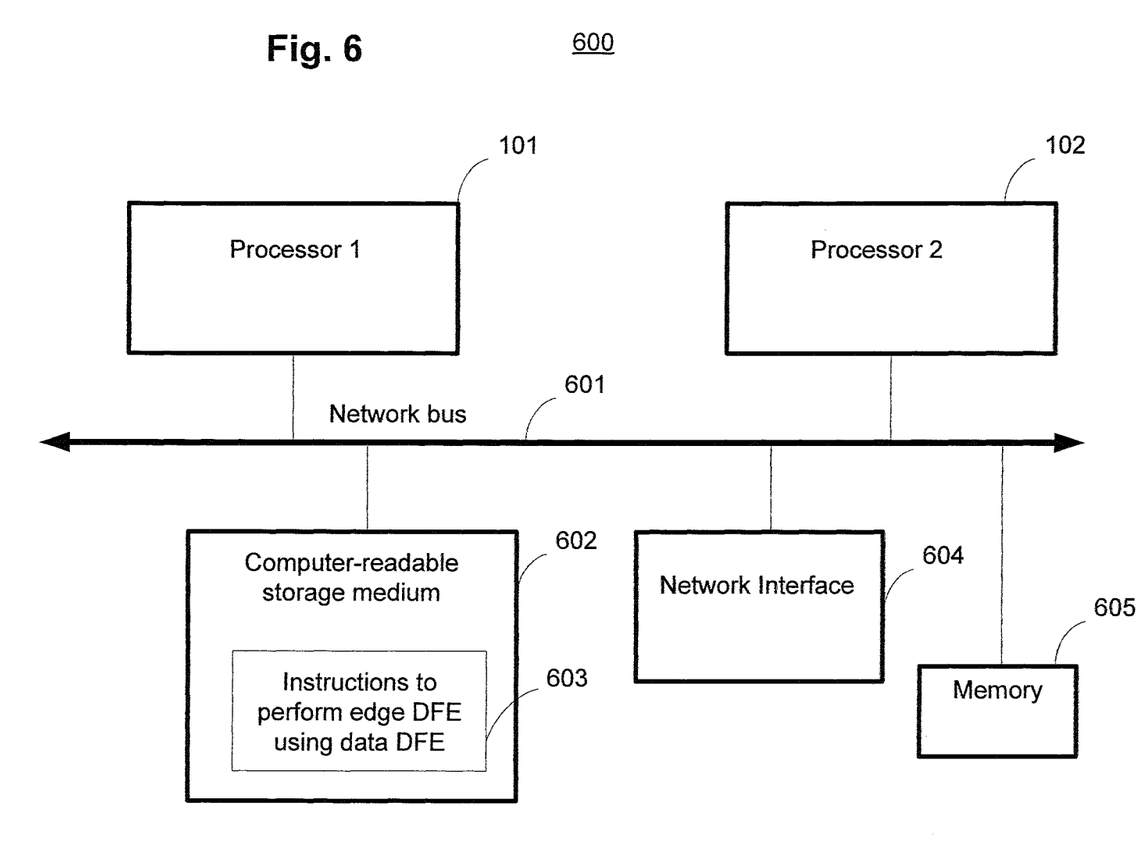
FIG. 6 illustrates a system having a computer-readable storage medium with computer executable instructions to perform a method for cancelling ISI on edge and data samples of a signal, according to one embodiment of the invention.

FIG. 6 illustrates a system 600 having a computer-readable storage medium 602 with computer executable instructions 603 to perform a method(s) (e.g., FIGS. 5A-C) for cancelling ISI on edge and data samples of the received signal 202, according to one embodiment of the invention. Embodiments of the invention are also implemented via the programmable computer-executable instructions 603.

In one embodiment, the system for executing the methods discussed above comprises the processor 101 coupled to the processor 102 via a network bus 601, the processor 102 having the receiver 104 (also called receiving unit) with logic to cancel ISI on edge and data samples of the received signal 202. The term "network bus" covers both transmission lines and wireless transmission medium. In one embodiment, the system 600 comprises a network interface 604 to connect components of the system 600 to the network e.g., the Internet. In one embodiment, the network is a wireless network. In one embodiment, the processor 102 is coupled to a memory 605 via the network bus 601 (wired of wireless). In one embodiment, the memory 605 is a DRAM.

The computer-readable storage medium 602 may include, but is not limited to, flash memory, optical disks, CD-ROMs, DVD ROMs, RAMs, EPROMs, EEPROMs, magnetic or optical cards, or other type of machine-readable storage media suitable for storing electronic or computer-executable instructions. For example, embodiments of the invention may be downloaded as a computer program which may be transferred from a remote computer (e.g., a server) to a requesting computer (e.g., a client) by way of data signals via a communication link (e.g., a modem or network connection).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

While the invention has been described in conjunction with specific embodiments thereof, many alternatives, modifications and variations of such embodiments will be apparent to those of ordinary skill in the art in light of the foregoing description. The embodiments of the invention are intended to embrace all such alternatives, modifications, and variations as to fall within the broad scope of the appended claims.

I claim:

1. An apparatus comprising:
a first logic unit to generate decision feedback equalizer (DFE) coefficients for data samples of a data signal;
a second logic unit to generate DFE coefficients for edge samples of the data signal, wherein the DFE coefficients for the edge samples of the data signal are based at least in part on the DFE coefficients for the data samples of the data signal; and
a third logic unit which comprises:
a first DFE summation logic unit to generate a corrected data sample from the DFE coefficients for the data samples of the data signal and previous data samples of the data signal;
a second DFE summation logic unit to generate a corrected edge sample signal from the DFE coefficients for the edge samples of the received data signal and the previous data samples of the received data signal;
a data sampling unit to sample the corrected data by a first clock signal; and
an edge sampling unit to sample the corrected edge sample signals by a second clock signal, wherein the first and second clock signals are delayed with respect to a reference signal.

2. The apparatus of claim 1, wherein the
third logic unit to compensate the data and edge samples of the data signal for inter-symbol interference at the data and edge samples of the data signal, and
wherein the third logic unit to compensate for inter-symbol interference by using the DFE coefficients for the data and edge samples generated by the first and the second logic units respectively.

3. The apparatus of claim 1, wherein the first logic unit comprises a DFE with an adaptive filter for generating the DFE coefficients for the data samples of the data signal.

4. The apparatus of claim 1, wherein the second logic unit is operable to apply linear approximation to the DFE coefficients for the data samples of the data signal to generate the DFE coefficients for the edge samples of the data signal.

5. The apparatus of claim 4, wherein the third logic unit further comprises:
a clock data recovery (CDR) unit to receive the sampled corrected data and edge sample signals, wherein the CDR unit to update a phase of the clock signal for sampling the data and edge sample signals.

6. The apparatus of claim 1, wherein the second logic unit comprises:
a first multiplier to multiply a first data DFE coefficient from the DFE coefficients for the data samples with an estimation factor to generate a first edge DFE coefficient;
an adder logic unit to add the first data DFE coefficient with a second data DFE coefficient from the DFE coefficients for the data samples of the data signal to generate a summation signal; and
a second multiplier to multiply the estimation factor with the summation signal to generate a second edge DFE coefficient, wherein the DFE coefficients for the edge samples of the data signal includes the first and second edge DFE coefficients.

7. The apparatus of claim 6 further comprises a register to store the estimation factor, wherein the estimation factor is programmable.

8. The apparatus of claim 1 further comprises a variable gain amplifier (VGA) which is operable to receive an input data signal from a transmission line and to generate the data signal.

9. The apparatus of claim 8, wherein the first logic unit is operable to adjust a gain of the VGA.

10. The apparatus of claim 1 further comprises a look-ahead logic unit to eliminate any timing violation caused by the data samples of the data signal.

11. The apparatus of claim 10, wherein the look-ahead logic unit is operable to receive the data samples of the data signal from a feedback path connecting the first logic unit to the third logic unit, wherein the look-ahead logic unit is operable to select a corrected data sample signal from a plurality of corrected data sample signals, and wherein the selected corrected data sample signal is without timing violation.

12. A system comprising:
a memory; and
a processor, coupled to the memory, comprising a receiving unit, the receiving unit operable to receive a data signal from a transmission medium, wherein the receiving unit comprises:
a first logic unit to generate decision feedback equalizer (DFE) coefficients for data samples of the received data signal; and
a second logic unit to generate DFE coefficients for edge samples of the received data signal, wherein the DFE coefficients for the edge samples of the received data signal are based at least in part on the DFE coefficients for the data samples of the received data signal; and
a third logic unit which comprises:
a first DFE summation logic unit to generate a corrected data sample from the DFE coefficients for the data samples of the data signal and previous data samples of the data signal;
a second DFE summation logic unit to generate a corrected edge sample signal from the DFE coefficients for the edge samples of the received data signal and the previous data samples of the received data signal;
a data sampling unit to sample the corrected data by a first clock signal; and
an edge sampling unit to sample the corrected edge sample signals by a second clock signal, wherein the first and second clock signals are delayed with respect to a reference signal.

13. The system of claim 12, wherein the
third logic unit to compensate the data and edge samples of the received data signal for inter-symbol interference at the data and the edge samples of the received data signal, and
wherein the third logic unit to compensate for inter-symbol interference by using the DFE coefficients for the data and edge samples.

14. The system of claim 12, wherein the first logic unit comprises a DFE with an adaptive filter for generating the DFE coefficients for the data samples of the received data signal.

15. The system of claim 12, wherein the second logic unit is operable to apply linear approximation to the DFE coefficients for the data samples of the received data signal to generate the DFE coefficients for the edge samples of the received data signal.

16. The system of claim 12, wherein the third logic unit further comprises:
a clock data recovery (CDR) unit to receive the sampled corrected data and edge sample signals, wherein the CDR unit to update a phase of the clock signal for sampling the data and edge sample signals.

17. The system of claim 12, wherein the second logic unit comprises:
a first multiplier to multiply a first data DFE coefficient from the DFE coefficients for the data samples with an estimation factor to generate a first edge DFE coefficient;
an adder logic unit to add the first data DFE coefficient with a second data DFE coefficient from the DFE coefficients for the data samples of the received data signal and to generate a summation signal; and
a second multiplier to multiply the estimation factor with the summation signal to generate a second edge DFE coefficient, wherein the DFE coefficients for the edge samples of the received data signal includes the first edge DFE coefficient and the second edge DFE coefficient.

18. The system of claim 17, wherein the processor further comprises a register to store the estimation factor, wherein the estimation factor is programmable.

19. The system of claim 12, wherein the receiving unit comprises a variable gain amplifier (VGA), and wherein the first logic unit is operable to adjust a gain of the VGA.

20. The system of claim 12, wherein the receiving unit further comprises a look-ahead logic unit to eliminate any timing violation in the data samples of the received data signal.

21. The system of claim 12, wherein the transmission medium is either a wireless transmission medium or a transmission line.

22. The system of claim 12, wherein the memory is a Dynamic Random Access Memory (DRAM).

23. A method comprising:
receiving a data signal from a transmitter over a transmission line;
generating decision feedback equalizer (DFE) coefficients for data samples of the received data signal;
generating DFE coefficients for edge samples of the received data signal, wherein the DFE coefficients for the edge samples of the received data signal are based at least in part on the DFE coefficients for the received data samples of the received data signal; and compensating the data and edge samples of the received data signal for inter-symbol interference at the data and edge samples of the received data signal, wherein compensating comprises:

generating a corrected data sample from the DFE coefficients for the data samples of the received data signal and previous data samples of the received data generating a corrected edge sample signal from the DFE coefficients for the edge samples of the received data signal and the previous data samples of the received data signal;

sampling the corrected data and edge sample signals by first and second clock signals respectively; and updating a phase of at least one of the first and second clock signals for sampling the data and edge sample signals;

wherein compensating for the inter-symbol interference is performed by using the DFE coefficients for the data and edge samples.

24. The method of claim 23, wherein generating the DFE coefficients for the data samples of the received data signal is performed by a DFE with an adaptive filter.

25. The method of claim 23, wherein generating the DFE coefficients for the edge samples of the received data signal comprises applying linear approximation to the DFE coefficients for the data samples of the received data signal.

26. The method of claim 23, wherein generating the DFE coefficients for the edge samples of the received data signal comprises:

multiplying a first data DFE coefficient from the DFE coefficients for the data samples with an estimation factor to generate a first edge DFE coefficient;

adding the first data DFE coefficient with a second data DFE coefficient from the DFE coefficients for the data samples of the received data signal to generate a summation signal; and multiplying the estimation factor with the summation signal to generate a second edge DFE coefficient, wherein the DFE coefficients for the edge samples of the received data signal includes the first and second edge DFE coefficients.

* * * * *